United States Patent [19]

Odames

[11] 4,039,178

[45] Aug. 2, 1977

[54] FLY TYING DEVICE

[76] Inventor: Kenneth Frank Odames, Crow Mill, Countesthorpe Road, South Wigston, Leiscester, England

[21] Appl. No.: 715,497

[22] Filed: Aug. 18, 1976

[30] Foreign Application Priority Data

Aug. 29, 1975 United Kingdom ............... 35676/75

[51] Int. Cl.² ............................................. B25B 1/22
[52] U.S. Cl. ...................................... 269/75; 269/236
[58] Field of Search ............. 269/75, 97, 98, 130–132, 269/236

[56] References Cited

U.S. PATENT DOCUMENTS

| | | | |
|---|---|---|---|
| 2,260,996 | 10/1941 | Kruczek | 269/75 |
| 2,302,523 | 11/1942 | Borsella | 269/75 |
| 2,586,636 | 2/1952 | Fischer et al. | 269/97 |
| R. 22,181 | 9/1942 | Schilling | 269/75 |

*Primary Examiner*—Al Lawrence Smith
*Assistant Examiner*—Robert C. Watson
*Attorney, Agent, or Firm*—Larson, Taylor and Hinds

[57] ABSTRACT

The invention relates to a fly-tying device which enables a fisherman to adjust the position of a clamped hook in a universal manner during the tying operation, changing its position both in an up-and-down sense and in turning it to an inverted condition, both in the same movement. The device incorporates a lockable universal joint, mounting the hook-gripping means in a clamp stand.

3 Claims, 3 Drawing Figures

FLY TYING DEVICE

BACKGROUND OF THE INVENTION

The invention is concerned with improvements in or relating to fly tying devices.

In fly fishing the "fly", a bundle of coloured threads, wings, bristles, or other material simulating a fly, is tied to the fisherman's hook before the latter is attached to the line. Different fish and different fishing conditions demand the use of variant forms of "fly", so that there is a continuous need for the tying of "flies" to hooks during a fishing session.

Fly tying — conventionally the winding of a silk thread round the assembled bundle and the hook — is a fastidious operation and must be expertly and tightly performed lest the "fly" be quickly and irretrievably lost. For this reason use is often made of a so-called tying vice. This consists of a stem upstanding from a clamp and carrying a U-shaped bracket between the arms of which is pivoted an arm for receiving and holding the fishing hook whilst the "fly" is tied to it. The arm is usually a tube which is provided at the loading end with a collet chuck for receiving the hook and at the opposite end with a finger for opening and closing the chuck through an over-dead-centre toggle in the tube.

In use the vice is clamped to a table or other convenient support and the arm pivoted to the angle most convenient to the fisherman. The arm is then locked at this angle by tightening a wing nut on a bolt which spans the arms of the bracket.

However, in order to hold the hook in the most convenient manner to allow maximum accessibility to the fisherman, it is frequently necessary, not merely to clamp the hook-carrying arm in one position, but to change that position in the course of the fly-tying operation. Preferably, the position change will require the hook to be inverted as well as including a change of angle of the arm. Provision for such adjustment normally requires two clamping means to be provided, one to locate the arm firmly in a selected position in a pivotal movement about a horizontal axis and the other to clamp the arm in either a normal or inverted position.

BRIEF SUMMARY OF THE INVENTION

It is an object of the present invention to provide a fly tying device which facilitates the required versatility of use without the need for additional clamping means.

The invention therefore provides a fly-tying device comprising a stand, a U-shaped bracket provided on said stand and having two side portions, fastening means spanning said side portions, jaw means mounted with respect to said arm and capable of gripping a hook, means whereby to operate said jaw in a hook-gripping action, said arm being mounted between the side portions of the bracket by means of a swivel joint of universal or cardan type.

Conveniently, the swivel joint comprises a part-spherical collar integral with the tube and partly received in a circular recess or aperture formed in the side portions of the bracket.

By using a device according to the invention, the fisherman is able not only to pivot the arm to the angle most suitable to him but can also invert the arm in its bearing to orientate it to present the hook in an even more advantageous disposition. As will be understood, not only can the arm be pivoted but it can be simultaneously inverted in a single movement before being locked in the chosen disposition.

BRIEF DESCRIPTION OF THE DRAWINGS

Two examples of embodiments of the invention are illustrated in the accompanying drawings, in which.

DETAILED DESCRIPTION OF THE DRAWINGS

Figure 1:
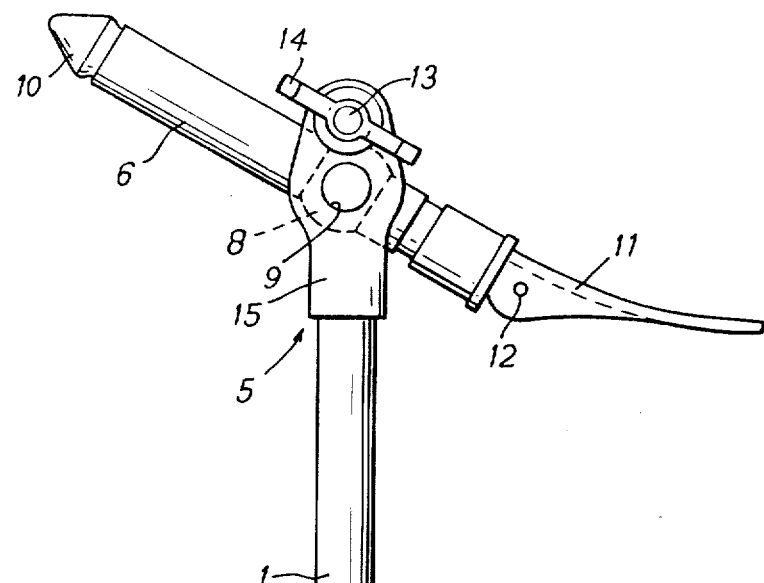
FIG. 1 is a side view of a first device in accordance with this invention.
Figure 2:
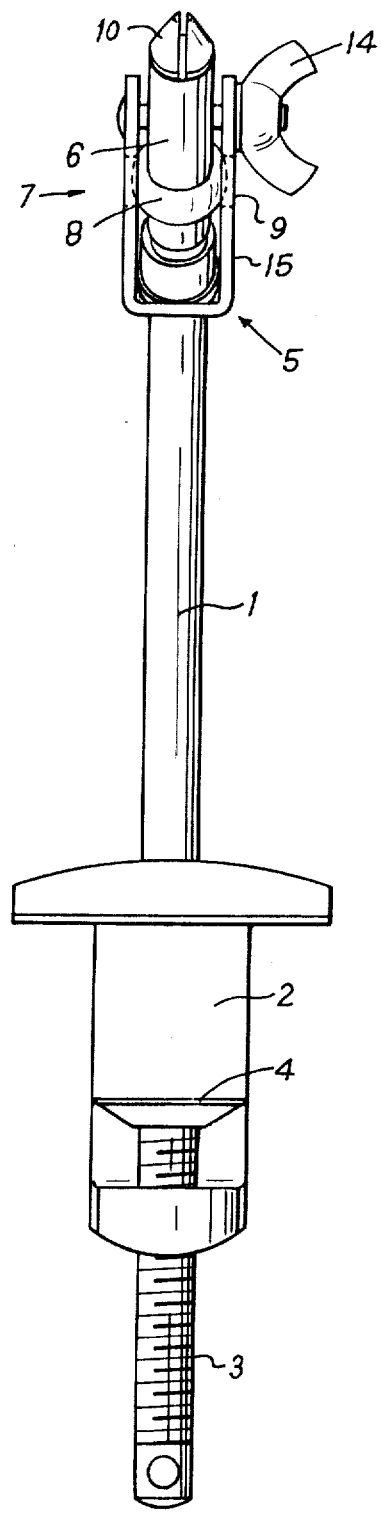
FIG. 2 is a front view of the device.

The first device illustrated in FIG. 1 and 2 comprises a rod 1 on which is mounted by means of a screw 16, a clamp 2 having a threaded bolt 3 carrying a head 4 for clamping the device to a table or other convenient support. At its upper end the rod 1 carries a U-shaped bracket 5, having side portions 15 which receive between them a tube or arm 6 forming the tying arm of the device. This tube is mounted in the bracket 5 by means of a swivel bearing, indicated at 7, comprising a part-spherical collar 8 integral with the tube 6 received in corresponding apertures 9 in each of the two side portions 15 of the bracket 5.

At its loading end the tube 6 is provided with jaw means in the form of a chuck 10 for receiving the fishing hook and at its opposite end with a finger 11 pivoted at 12 and operable to open and close the jaws of chuck 10 by means of a toggle mechanism (not shown) within the tube 6.

A threaded bolt 13 passes through the ends of the side portions of bracket 5 and is provided with a wing nut 14 by means of which the parts of the side portions 15 of the bracket 5 can be urged together or eased apart, thereby to clamp the tube 6 in its selected adjusted and orientated position, or to loosen it as required.

Figure 3:
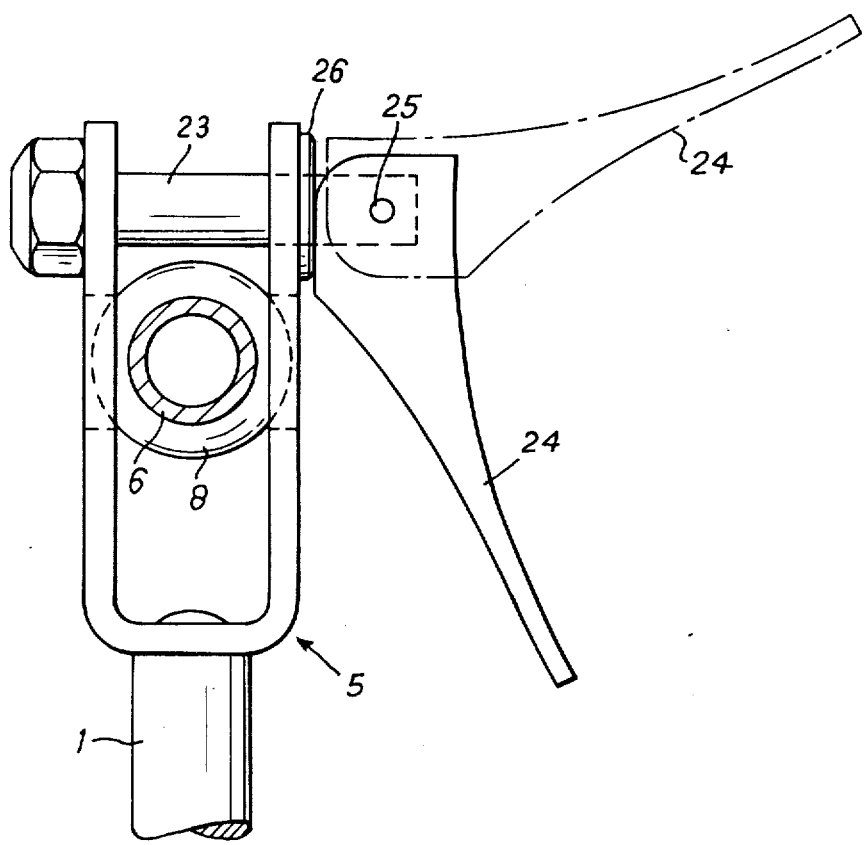
FIG. 3 is a fragmentary view of a second device according to the invention showing a feature thereof on an enlarged scale.

FIG. 3 shows a second device according to the invention. This device is similar to the first device except in the following respect. In the second device a headed rod 23 passes through the upper ends of the side portions 15 of the bracket 5 and a finger 24 is pivotally mounted on the free end of the rod at 25 so that when the finger is in the position shown in full lines the swivel joint 7 is locked and when it is in the dotted line position, the joint 7 is freed, since the base surface of the finger no longer presses against the side portion 15. Thus the facility for universal adjustment in a single movement is available.

I claim:

1. A fly-tying device comprising a stand, a U-shaped bracket provided on said stand and having two side portions, fastening means spanning said side portions, a tube receivable between said side portions, jaws means mounted with respect to said tube for gripping a hook, means for operating said jaw to cause said jaw to grip a hook and a swivel joint mounting said tube between the side portions of the bracket, said swivel joint comprising a part-spherical collar integral with the tube and means defining a circular collar-receiving opening formed in the side portions of the bracket in which said collar is mounted.

2. A device in accordance with claim 1, wherein the fastening means spanning the side portions of the bracket comprise a threaded bolt passing through end parts of the side portions and adjustably engaged by a wing nut.

3. A device in accordance with claim 1, wherein the fastening means spanning the side portions of the bracket comprise a headed rod passing through end parts of the side portions and, pivotally connected to a free end of the rod, a finger adapted for movement between a position in which a base surface thereof urges the side portions together and an inoperative position.

* * * * *